United States Patent [19]

King et al.

[11] 4,097,909
[45] Jun. 27, 1978

[54] MAGNETIC TRANSDUCER WITH INNER AND OUTER MAGNETIC MEDIUM COOPERATING SURFACE ZONES OF DIFFERENT CONVEXITY

[75] Inventors: Francis Kong King, Rochester; Jon Jay Schmidt, Stewartville, both of Minn.

[73] Assignee: International Business Machines Corporation, Armonk, N.Y.

[21] Appl. No.: 752,765

[22] Filed: Dec. 20, 1976

[51] Int. Cl.² .............................................. G11B 5/82
[52] U.S. Cl. ........................................ 360/99; 360/86; 360/122
[58] Field of Search ............ 360/99, 98, 86, 102–103, 360/129, 130, 122

[56] References Cited

U.S. PATENT DOCUMENTS

| | | | |
|---|---|---|---|
| 3,416,148 | 12/1968 | Berghaus et al. | 360/102 X |
| 3,821,813 | 6/1974 | Freeman et al. | 360/102 |
| 3,947,887 | 3/1976 | Platter | 29/603 X |
| 3,975,769 | 8/1976 | King | 360/98 X |

*Primary Examiner*—John H. Wolff
*Attorney, Agent, or Firm*—Keith T. Bleuer

[57] ABSTRACT

A magnetic transducer for use with a flexible disk and having inner and outer portions of respectively less and greater convex sphericity providing a central spherical surface zone within a surrounding spherical surface zone. The magnetic gap is centrally located in the central surface zone. The radius for the outer portion has a center on the center line of the transducer, and the center of curvature of the inner portion is spaced from the center line of the transducer in the direction of motion of the disk across the transducer so that most of the central zone faces the direction of disk movement.

9 Claims, 10 Drawing Figures

MAGNETIC TRANSDUCER WITH INNER AND OUTER MAGNETIC MEDIUM COOPERATING SURFACE ZONES OF DIFFERENT CONVEXITY

BACKGROUND OF THE INVENTION

The invention relates to flexible magnetic disks and more particularly to magnetic transducers particularly suitable for use with such disks.

It has previously been proposed in U.S. Pat No. 3,975,769 issued Aug. 17, 1976 to Francis K. King to provide a magnetic transducer having a simple spherical surface which contacts a flexible disk for obtaining a reading and writing action using a magnetic gap in the spherical surface of the transducer. For most applications, such a simple spherical surface is entirely satisfactory; however, when it is desired to increase the recording density to high levels, such as 10,000 bits per inch, it has been found that such a transducer is not uniformly and consistently capable of recording and reading with such a bit density. The compliance of the flexible disk with this simple spherical surface has been found to change slightly with time, particularly with changing ambient air temperatures and humidity which change the disk stiffness. Also, it has been found that slight manufacturing tolerances will cause some of such magnetic transducers in a batch to be unsuitable as not providing the close disk compliance needed, since the area of close compliance with such a simple spherical transducer is very small, such as 0.050 inch (1.27 mm) in diameter, resulting into waste of production.

SUMMARY OF THE INVENTION

It is an object of the invention to provide an improved transducer particularly suitable for use with flexible disks and more particularly to provide improved contours for such a transducer so that the transducer has a larger area of close disk compliance which remains essentially uniform even with changes in environment, such as changes of temperature and moistness.

In a preferred form, the transducer of the invention has two spherical convex surface zones that are adapted to have a close compliance with a flexible disk as the flexible disk rotates. The surface zones include a central zone which has a relatively large radius and an enclosing outer zone which has a relatively small radius. The center of the small radius is disposed on the center line of the transducer, and the center of the large radius is disposed on a center that is spaced from the center line of the transducer in the direction of movement of the disk as it moves across the transducer so that most of the central zone faces the direction of movement of the disk, with the leading part of the outer spherical zone facing this direction being relatively short compared to the trailing part of the outer spherical zone.

DESCRIPTION OF THE PREFERRED EMBODIMENTS

Figure 1:
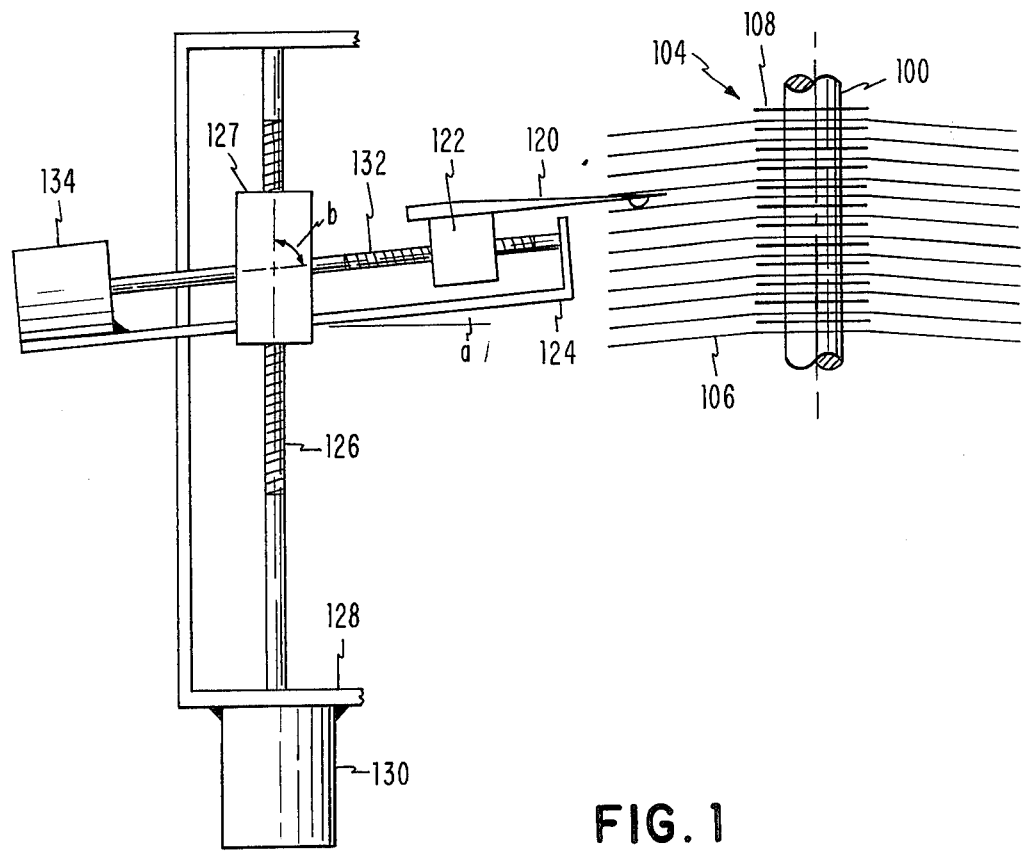
FIG. 1 is a side elevational view of a random access recording device including a vertical stack of rotatable disks, an access arm having a magnetic transducer embedded in it for moving between the disks, and a power mechanism for moving the access arm vertically along the periphery of the disk stack and then radially into the stack.
Figure 2:
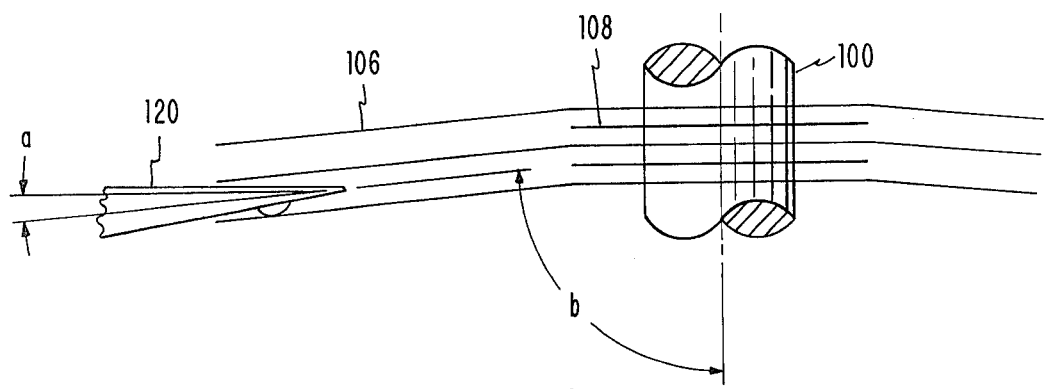
FIG. 2 is a partial side elevational view on an enlarged scale of the disk stack and of the access arm positioned between a pair of the disks of the stack.
Figure 3:
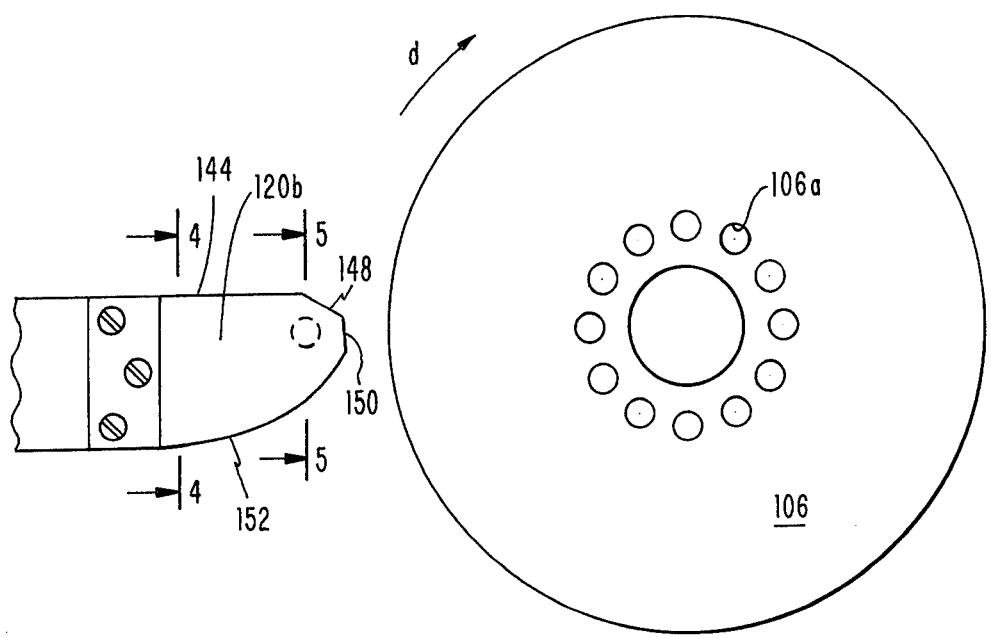
FIG. 3 is a plan view of one of the magnetic disks and of the access arm as the access arm is about to move into the stack of disks.
Figure 4:
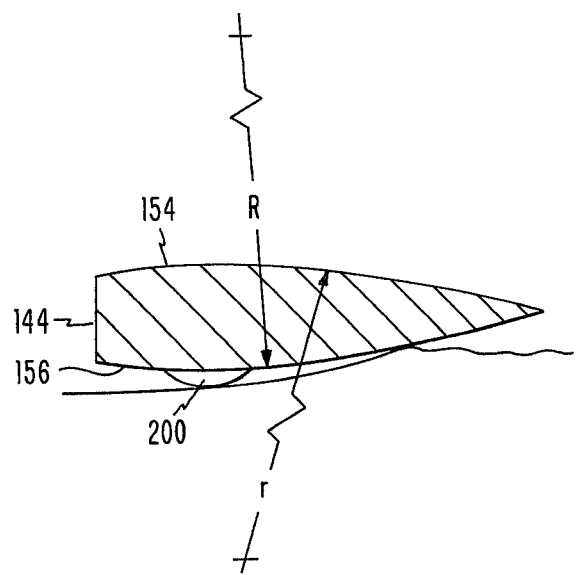
FIG. 4 is a sectional view on an enlarged scale taken on line 4—4 of FIG. 3.

Referring now to FIG. 1 in particular, the random access magnetic recording device therein disclosed may be seen to comprise a vertical spindle 100 adapted to be rotatably driven from any suitable power source. A stack 104 of individual magnetic disks 106 is mounted on the spindle 100. The disks 106 may be of flexible material, such as polyethylene terephthalate, and may be, for example, of 0.003 inch (0.0762 mm) thickness. Spacing washers 108 are disposed between consecutive disks 106; and each washer may, for example, have a thickness of 0.007 inch (0.177 mm). Each of the disks 106 has 12 openings 106a through it, and the openings 106a of the disks 106 in their stacked relationship are preferably in alignment. The disks 106 may be fixed with respect to the spindle 100 by any suitable means.

A magnetic access arm or platform 120 is provided for entering between the disks 106. The access arm 120 is fixed with respect to a carriage 122 that in turn is reciprocally mounted within a carriage 124. The carriage 124 is moveable vertically as shown in FIG. 1 and has a lead screw 126 passing through an internally threaded portion 127 of the carriage 124. The lead screw 126 is rotatably disposed in a vertical stationary standard 128; and a motor 130, preferably of the electrical stepping type and fixed with respect to the standard 128, is connected to the lead screw 126 for the purpose of rotating the lead screw in one direction or the other for thereby moving the carriage 124 either upwardly or downwardly. The carriage 122 is disposed on a lead screw 132 carried by the carriage 124; and a motor 134, preferably of the electrical stepping type, is fixed with respect to the carriage 124 for the purpose of drivingly rotating the screw 132 in one direction or the other for thereby moving the carriage 122 and thereby the access arm or platform 120 toward and away from the spindle 100. It will be noted that the lead screw 132 and the carriage 124 extend upwardly at a small acute angle $a$ with respect to horizontal and at the complementary angle $i$ with respect to vertical, it being assumed that both the lead screw 126 and the spindle 100 extend vertically.

The access arm or platform 120 is of the same type as is described in Francis K. King Pat. No. 3,975,769, issued Aug. 17, 1976 which is therefore incorporated herein insofar as the platform 120 and its dimensions are concerned. The platform 120 has a variable thickness working portion 120b which is defined by the blunt side edge 144 that is straight for most of the length of the arm 120, an edge 148 that extends at an acute angle with respect to the edge 144, a distal arm end or tip 150 and a sharp arm side edge 152 that curves toward edge 144 so that the arm 120 narrows towards its tip 150. The platform 120 has upper and lower surfaces 154 and 156 both of which are curved. The surface 154 is constructed on a radius r which is considerably less than the radius R on which the surface 156 is constructed as described in patent 3,975,769. The portion of the transducer 162 in patent 3,975,769 protruding from the lower surface of the access arm of this patent is spherical and has a radius of 1.5 inches as described in this patent. A transducer 200 is embedded in the platform 120 hereof, and the transducer 200 is located within the platform 120 in the same position as that in which the transducer 162 of patent 3,975,769 is located in the access arm 120 of patent 3,975,769 with transducer 200 protruding from the lower surface 156 of the access arm 120 herein.

Figure 5:
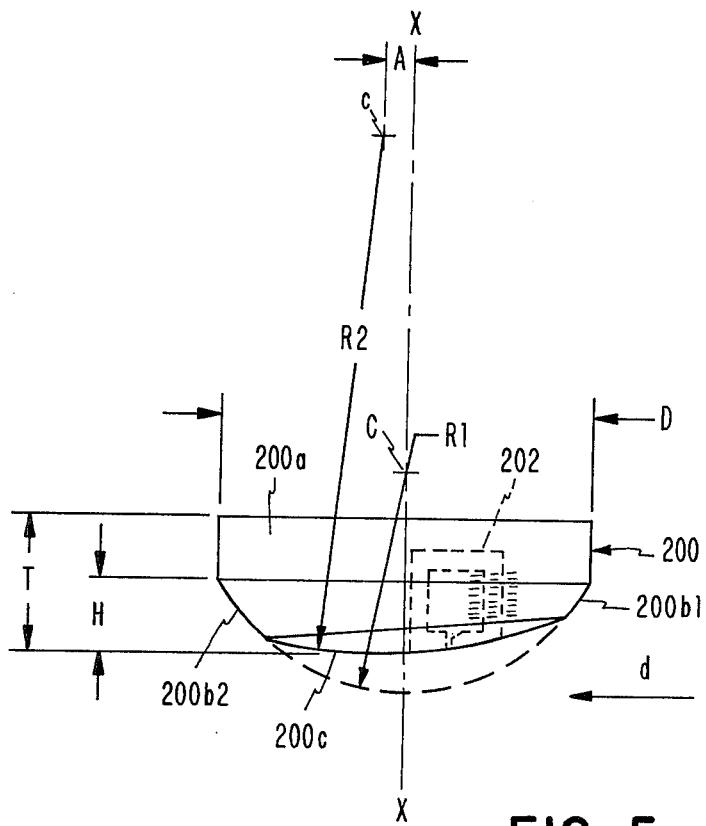
FIG. 5 is a sectional view of the transducer carried by the access arm and taken on an enlarged scale on line 5—5 of FIG. 3.
Figure 6:
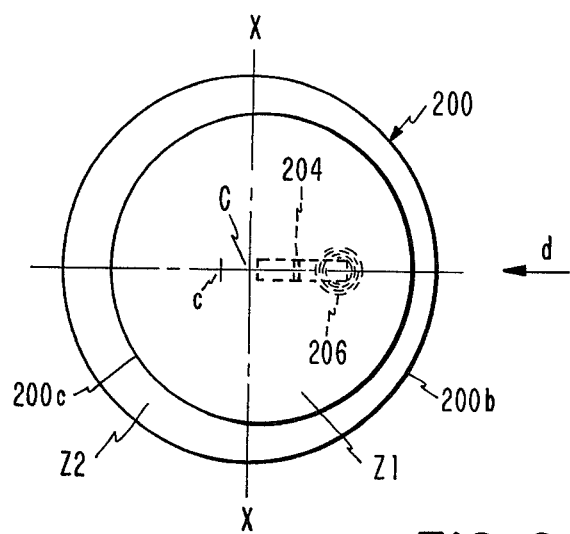
FIG. 6 is a bottom view of the transducer as shown in FIG. 5.

As is shown particularly in FIGS. 5 and 6, the transducer 200 comprises three portions 200a, 200b and 200c. The portion 200a is cylindrical and is completely embedded within the platform 120. The portions 200b and 200c protrude from the lower surface 156 of the platform 120 and are spherical, forming a spherical central surface zone Z1 within and bounded by an outer spherical surface zone Z2 on the transducer 200. The portion 200b has a radius of R1, and the portion 200c has a radius of R2 which is substantially greater than the radius R1. The center C of the radius R1 is located on the center line X—X of the transducer 200, and the center c of the portion 200c is spaced by a distance A from the center line X—X. Both of the zones Z1 and Z2 have ring-shaped outer boundaries. More particularly, the outer boundary of the zone Z2 is circular since it is at one end of the cylindrical portion 200a, and the outer boundary of the zone Z1 is elliptical but is very close to being round since the distance A is not large. A flexible disk 106 moves in direction d across the portion 200b and 200c as the disk 106 rotates, and it will be noted from FIG. 6 in particular that the center c is located in the direction d from the center line X—X.

The diameter of the transducer 200 is shown in FIG. 5 as the quantity D, and the quantities T and H are the various thicknesses of the transducer 200 as shown in FIG. 5. The following table sets forth values that may be used for the dimensions set forth in FIG. 5 (it will be understood of course that these values may be varied from those give below, particularly if the diameter D of transducer 200 is changed):

D = 0.375 inch (9.52 mm)
H = 0.011 inch to 0.016 inch (0.279 mm to 0.406 mm)
T = To fit, considering the thickness of arm 120
R1 = 0.75 inch to 1.25 inch (19.05 mm to 31.75 mm)
R2 = 3.00 inch to 4.00 inch (76.2 mm to 101.6 mm)
A = 0.040 inch to 0.050 inch (1.01 mm to 1.27 mm)

Particularly since the diameter D of the transducer 200 may be changed, the following ratios are considered important:

R1/D = 2 to 3.3
R2/D = 8 to 11
A/D = 0.1 to 0.135

A magnetic core 202 is embedded in the transducer 200 and constitutes a closed core except for a read/write gap 204 which exists on the lower, exterior surface of the portion 200c on surface zone Z1. A winding 206 is disposed about one of the legs of the core 202. The core 202, together with the winding 206 and gap 204 may more particularly have the construction that is disclosed in greater detail in patent 3,975,769 for the transducer 162 therein, with the core and winding being embedded within the transducer as a whole which may be of insulating material. It will be noted from FIG. 6 herein in particular that the gap 204 is located approximately at the center of the spherical surface zone Z1.

In operation, the disks 106 is the pack 104 are rotated at a rather high speed in direction d, such as 1800 rpm (756 inches per second on the edges of the disks). The carriages 122 and 124 are elevated to the desired position to correspond with the disk 106 on which it is desired that information shall be either recorded thereon or read therefrom. This is done by suitably energizing the electrical stepping motor 130 to turn the screw 126. The carriage 122 is then moved toward the spindle 100 so as to move the platform 120 carrying the transducer 200 between the desired pair of disks 106. This is done by using motor 134 and screw 132. This movement is at the angle a with respect to horizontal corresponding to the downward droop of the disks 106 due to gravity, and an easy movement of the platform 120 between the desired pair of disks 106 occurs. Mechanism for moving an access arm into a stack of flexible disks for the purpose of approximately matching the drooping disposition of the disks with the direction of movement of the access arm is described in an International Business Machines Technical Disclosure Bulletin entry of February, 1977 by F. K. King and D. J. Wanek entitled "Flexible Disk Pack Splitter Arm Accessing Mechanism". The transducer 200 herein then has a very close relationship with respect to the disk 106 which is immediately below the platform 120 so that a magnetic reading or writing action may take place. The movement of the disks 106 due to their rotation is in the direction d that is in the same direction as the direction in which the core 202 extends and is at right angles to the direction in which the gas 204 extends for the reading or writing action.

It has been found that by providing the two spherical portions 200b and 200c and spherical surface zones Z1 and Z2 on the transducer 200, these constituting the portions of the transducer that are exposed beneath the lower surface 156 of the platform 120, very close compliance of the disk 106 just below the platform 120 with the transducer 200 and particularly its surface zone Z1 is obtained. This disk may fly with respect to the transducer portion 200c with only 20 micro-inches space between the disk and transducer portion 200c so that a very high density of recording may be made on the disk, and likewise this high density of recording may be read using the transducer 200. It has been found also that this very close spacing under flying conditions is substantially uniform for the complete area of the spherical transducer portion 200c and surface zone Z1. It is not particularly important to have the full area in close compliance assuming that the gap 204 always remains at this spacing with respect to the disk 106 just below the transducer 200; however, in actual practice using a simple spherical transducer as disclosed in patent 3,976,769, it has been found that the flying height of a disk with respect to the transducer changes with changes of ambient air temperature and humidity, and the two spherical portions 200b and 200c cause the flying height of the disk to remain not only very close but also very stable as disk rotation continues.

Figure 7:
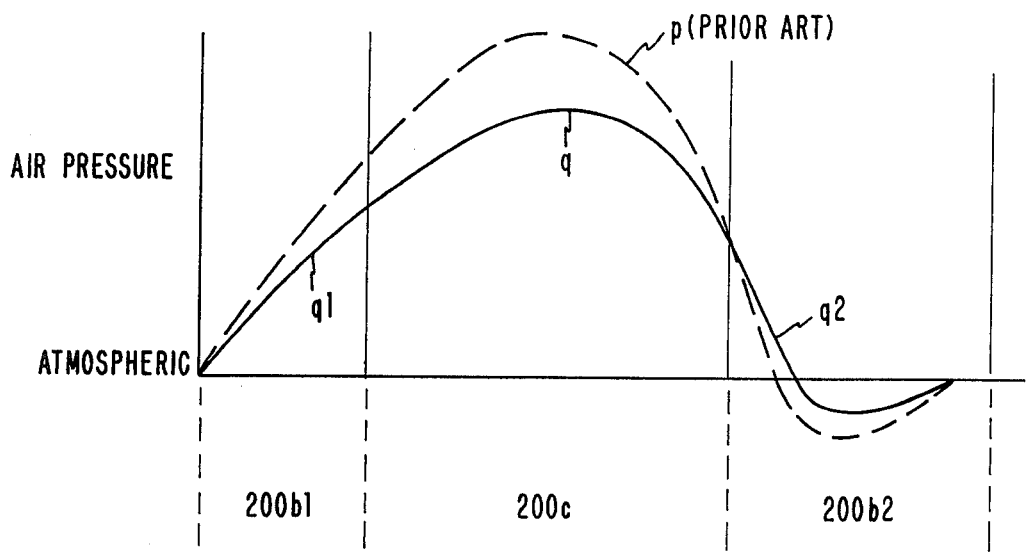
FIG. 7 is a graph showing the air pressure on the bottom surfaces of the transducer shown in FIGS. 5 and 6 as one of the flexible disks travels across the bottom surfaces of the transducer and also showing a comparable air pressure curve for a simple spherical transducer of the prior art.

The two spherical portions 200b and 200c apparently function to provide a substantially uniform flying height between the transducer 200 and the flexible disk 106 just below it in the stack 104 due to the air controlling effects of the spherical surface zones Z1 and Z2. As this disk 106 moves across the transducer 200, the portion of this disk 106 that moves across the gap 204 traveling in direction d first moves over the leading part 200b1 of the transducer portion 200b having the relatively small radius R1, then moves over the portion 200c of the transducer containing the gap 204 and formed on the relatively large radius R2 and then moves over the trailing part 200b2 of the transducer portion 200b which has the relatively small radius R1. In causing the disk to have a relatively stable unvarying and close flying height with substantially the full surface zone Z1, the leading part 200b1 of the spherical portion 200b apparently has the effect of breaking the air film carried by the disk 106 just below the transducer 200 and scrubbing air from this disk 106. In obtaining this result, the trailing part 200b2 of the transducer portion 200b has the action of providing a vacuum effect and lowering the air pressure as the disk leaves the transducer portion 200c in moving in direction d so as to assure that the disk hugs the transducer portion 200c. The less convex spherical portion 200c has an air channeling and splitting effect and produces more movement of air sidewardly of the transducer than does a plain spherical transducer surface with a greater leakage effect causing the spacing between transducer 200 and a disk 106 to be more uniform for the complete area of the zone Z1. This is particularly true since the major part of zone Z1 faces the direction of disk movement due to the dimension A. The composite effect of the spherical surface zones Z1 and Z2 is shown graphically in the curves of the FIG. 7 graph. The dotted line curve having the parts $q1$, $q$, and $q2$ show the air pressure beneath the transducer 200 as the disk 106 just below the transducer passes across the transducer. The air pressure rises as shown by the curve portion $q1$ as the disk passes across the transducer part 200b1; the air pressure remains nearly the same as shown by the curve portion $q$ as the disk passes across the transducer portion 200c; and the air pressure decreases and passes through zero as shown by the curve portion $q2$ as the disk passes across the trailing transducer part 200b2. Due to the dimension A between the center c and the vertical axis X—X of the transducer 200 and the air splitting effect of zone Z1 for the air traveling with the disk, zone Z1 produces the relatively flat portion $q$ in FIG. 7; and the flatness and convexity of the curve portion $q$ may be controlled by changing the dimension A of FIG. 5. The curve $p$ shows the variation of air pressure with a simple spherical transducer surface as in patent 3,975,769 being used in lieu of the duel spherical surfaces Z1 and Z2 and indicates that the air pressure on the transducer varies more than is the case with the dual spherical surfaces. This is true for both the portions 200b and 200c and for both the subatmospheric and hyperatmospheric pressures on transducer 200 shown in FIG. 7.

The corresponding changes of spacing between a transducer having a single exposed spherical surface and the transducer having dual exposed spherical surfaces as shown in FIGS. 5 and 6 herein has been experimentally demonstrated using light interference rings. Six or eight black interference rings (using light of 12.5 micro-inches wave length) were obtained on an area of the single contoured transducer, while for the same area of the transducer portion 200c only two such interference rings occurred, demonstrating that the spacing of the disk and transducer hereof was substantially the same and materially more constant than for a single contoured transducer.

Figure 9:
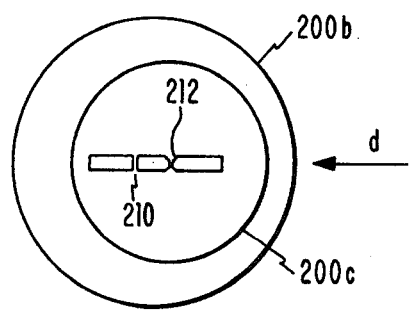
FIG. 9 is a view similar to FIG. 6 and showing a bottom view of the dual gap transducer of FIG. 8.
Figure 8:
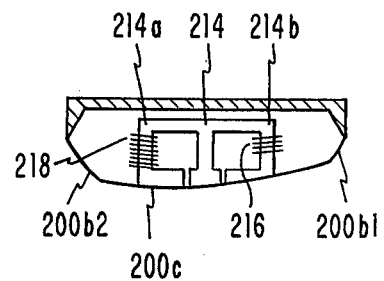
FIG. 8 is a view similar to FIG. 5 and showing a modification of the invention in which the transducer contains two magnetic gaps in lieu of just one.

If no substantial changes of compliance of a disk with respect to a single contoured transducer having a spherical surface of a single uniform radius occurred with temperature and humidity changes, it would be theoretically possible to locate a read/write gap at the proper position in the spherical surface of the transducer so that consistently reliable reading and writing could be obtained, but it would not be possible to provide a plurality of spaced gaps with high density recording due to the large variation of disk transducer compliance. With the dual contoured transducer 200 herein having the spherical surfaces Z1 and Z2 of the two radii R1 and R2, however, it has been found as just mentioned that the spacing of the disk over the surface of the transducer zone Z1 is substantially the same for the complete surface of the zone Z1 and does not vary with such changes of the ambient air. Therefore, it is possible to provide a plurality of gaps in the transducer portion 200c with substantially the same spacing and ability to magnetically read and write existing for all of the plurality of gaps. Such a multi-gap transducer is shown in FIGS. 8 and 9. The transducer of FIGS. 8 and 9 has the same spherical portions 200b and 200c with the leading and trailing surfaces 200b1 and 200b2 in a line with the two gaps 210 and 212 which are aligned in the direction d of disk movement. The gaps 210 and 212 are formed by a magnetic core 214 having legs 214a and 214b. The gap 212 may be a read or write gap, and the gap 210 may also be either a read or write gap. Since the gap 210, however, is shown having a greater effective length then the gap 212, the gap 210 may well be used as an erase gap while the gap 212 may be used as either a write or read gap. A read/write coil 216 is disposed on the leg 214b and a read/write coil 218 is disposed on the leg 214a. Since the two curvatures about radii R1 and R2 exist for the complete exposed surface of the transducer, a reliable reading and writing action is obtained using the two gaps 210 and 212

Figure 10:
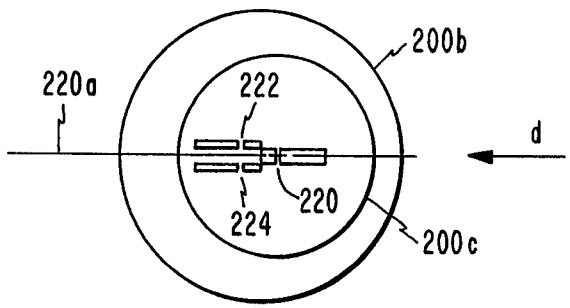
FIG. 10 is a view similar to FIGS. 6 and 9 and showing a modified transducer having three gaps therein in lieu of only one or two such gaps.

FIG. 10 shows a modified transducer having the same spherically contoured portions 200b and 200c, but the transducer of FIG. 10 includes a read/write gap 220 and two erase gaps 222 and 224 on opposite sides of the gap 220 with respect to the center line 220a of the gap 220 which extends in the direction d of disk movement. The magnetic core forming the gaps 220, 222 and 224 in elevation appears substantially the same as that of the core 214 in FIG. 8, but there would preferably be provided one winding for each of the gaps 222 and 224 in addition to a winding for the read/write gap 220.

Concisely, therefore, the dual contoured transducer 200, having a central spherical surface zone Z1 of relatively large radius and a surrounding spherical surface zone Z2 of relatively small radius, results in practically the entire spherical surface zone Z1 of the part 200c having the same uniform close compliance with a flexible disk, with this close compliance being unvarying with time due to changes in air temperature, moistness, etc. Furthermore, the large area of close compliance allows the usual manufacturing tolerances to have no substantial effect on the number of rejects of transducers 200 during a manufacturing run, with substantially the complete output being acceptable and providing the close compliance of disk and transducer of substantially 20 micro-inches spacing. Since the area of close compliance of transducer and disk is increased (this increase has been found experimentally to be two-tenths inch diameter from the previous close compliance area using a single spherical area of 0.050 inch diameter), this allow the plurality of gaps as shown in FIGS. 8, 9 and 10 to be used in lieu of only a single gap in the transducer.

Although the improved transducers of the invention have been mentioned particularly for use with flexible disks, it will be understood that these transducers may also be used with improved results in connection with other flexible magnetic media, such as tapes, particularly when these tapes are of quite broad expanse.

We claim:

1. A transducer adapted to have a data transferring relationship with a flexible medium comprising:
   a body formed with a first surface zone within and bounded by a second surface zone,
   a magnetic core having a gap therein which is on the surface of said first zone,
   each of said zones having a rounded convex external surface and a ring-shaped boundary and said first zone being of less convexity than said second zone whereby said gap lies in close proximity to said flexible medium as the medium moves across said surface zones.

2. A transducer as set forth in claim 1, the external surfaces of said zones being spherical.

3. A transducer as set forth in claim 1, the external surfaces of said zones being spherical and the boundary of said second zone being round, the ratio of the radius for said second zone to the diameter of said second zone boundary being between 2 and 3.3 and the ratio of the radius for said first zone to the diameter of said second zone boundary being between 8 and 11.

4. A transducer as set forth in claim 1, the external surface of said second zone being spherical and said second zone having a round boundary and being formed on a radius from a center on the center line of said round boundary, the external surface of said first zone being spherical and said first zone being formed on a radius which is larger than said radius for said second zone and from a center which is spaced from said center line.

5. A transducer as set forth in claim 1, the external surface of said second zone being spherical and said second zone having a round boundary and being formed on a radius from a center on the center line of said round boundary, the external surface of said first zone being spherical and said first zone being formed on a radius which is larger than said radius for said second zone and from a center which is spaced at a certain distance from said center line, the ratio of said certain distance to the diameter of said boundary of said second zone being between 0.1 and 0.135.

6. In combination, a flexible medium and means for moving said flexible medium in a certain direction, and
   a transducer comprising a body formed with a first surface zone within and bounded by a second surface zone which are in contact with said medium as the medium moves, a magnetic core having a gap therein which is on the surface of said first zone, each of said zones having a rounded convex external surface and a ring-shaped boundary and said first zone being of less convexity than said second zone whereby said gap may be in close proximity with said flexible medium as the medium moves across said surface zones.

7. The combination as set forth in claim 6, the external surfaces of said zones being spherical and said second zone having a round boundary, said second zone being formed with a radius of curvature with a center on the center line of said round boundary and said first zone being formed with a radius of curvature which is longer than the radius of curvature of said second zone and has its center spaced from said center line in the direction of movement of said medium across said surface zones.

8. In combination,
   a stack of spaced flexible disks mounted on a spindle which is rotatable so that the disks are relatively moved in a certain direction,
   an access arm disposed between a pair of said disks and in cross-section having a relatively sharp leading edge and a relatively blunt trailing edge considering the direction of rotation of said disks, and
   a transducer carried by said access arm and protruding from a surface of the arm so as to be in contact with a flexible disk located immediate to said access arm, said transducer having a body formed with a first surface zone within and bounded by a second surface zone, and said body protruding from the surface of said access arm so as to be in contact with said last mentioned flexible disk, and a magnetic core having a gap therein which is on the surface of said first zone, each of said zones having a rounded convex external surface and a ring-shaped boundary and said first zone being of less convexity than said second zone whereby said gap is in close proximity with said last mentioned flexible disk.

9. The combination as set forth in claim 8, said zones having spherical external surfaces and the boundary of said second zone being round, said second zone being formed on a radius from a center on the center line of said round boundary and said first zone being formed on a radius which is larger than said radius for said second zone and from a center which is spaced from said center line in the direction of movement of said last mentioned disk across said surfaces.

* * * * *